(12) United States Patent
Yanagida

(10) Patent No.: US 8,035,051 B2
(45) Date of Patent: Oct. 11, 2011

(54) ELECTRONIC DEVICE

(75) Inventor: Atsuhiro Yanagida, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/860,833

(22) Filed: Aug. 20, 2010

(65) Prior Publication Data

US 2011/0149523 A1    Jun. 23, 2011

(30) Foreign Application Priority Data

Dec. 22, 2009 (JP) ................................. 2009-291290

(51) Int. Cl.
*H01H 9/02* (2006.01)
(52) U.S. Cl. ...................................... 200/343; 200/296
(58) Field of Classification Search .................. 200/520, 200/292, 296, 341, 343, 5 R; 341/22; 345/168, 345/169; 361/679.01–679.18, 679.55, 679.56, 361/748, 752, 758
See application file for complete search history.

(56) References Cited

U.S. PATENT DOCUMENTS

| | | | | |
|---|---|---|---|---|
| 6,219,038 B1 * | 4/2001 | Cho | ............... | 345/173 |
| 6,560,119 B1 * | 5/2003 | Katsuyama et al. | ............ | 361/752 |
| 6,859,355 B2 * | 2/2005 | Chuang et al. | ............. | 361/679.1 |
| 6,914,206 B2 * | 7/2005 | Mukougawa | ................. | 200/556 |
| 7,268,312 B2 * | 9/2007 | Chen | ............... | 200/343 |
| 7,446,276 B2 * | 11/2008 | Plesko et al. | ................. | 200/343 |
| 7,544,904 B2 * | 6/2009 | Nakatani et al. | ............... | 200/5 A |
| 7,564,002 B2 * | 7/2009 | Watanabe | ...................... | 200/344 |
| 7,635,821 B2 * | 12/2009 | Hamada | ......................... | 200/343 |
| 7,642,477 B2 * | 1/2010 | Peng et al. | ...................... | 200/339 |

FOREIGN PATENT DOCUMENTS

| | | |
|---|---|---|
| JP | U52-155029 | 11/1977 |
| JP | U62-76440 | 5/1987 |
| JP | U02-46335 | 3/1990 |
| JP | 11-154438 A | 6/1999 |
| JP | 2001-006484 A | 1/2001 |
| JP | 2001-015959 A | 1/2001 |
| JP | 2001-155578 A | 6/2001 |
| JP | 2007-280659 A | 10/2007 |

OTHER PUBLICATIONS

Notice of Reasons for Rejection mailed by Japan Patent Office on Nov. 16, 2010 in the corresponding Japanese patent application No. 2009-291290.
Translation of References for JP U52-155029, JP U62-76440 & JP U02-46335.

* cited by examiner

*Primary Examiner* — Michael Friedhofer
(74) *Attorney, Agent, or Firm* — Knobbe, Martens, Olson & Bear LLP

(57) ABSTRACT

According to one embodiment, an electronic device includes a housing in which an opening is made, a button fit inside the opening such as to be movable forward and backward, a printed wiring board housed inside the housing and provided with a switch which detects pushing operation of the button and a pair of supports. Each of the supports projects inside the housing such as to support both end portions of the printed wiring board and also serve as a stopper for the button.

5 Claims, 7 Drawing Sheets

ELECTRONIC DEVICE

CROSS-REFERENCE TO RELATED APPLICATIONS

This application is based upon and claims the benefit of priority from Japanese Patent Application No. 2009-291290, filed Dec. 22, 2009; the entire contents of which are incorporated herein by reference.

FIELD

Embodiments described herein relate generally to an electronic device comprising a button.

BACKGROUND

Jpn. Pat. Appln. KOKAI Publication No. 2001-15959 discloses a mount structure in which a push-button switch is mounted, comprises a boss provided on a bottom surface of a housing of the device, a packaged circuit board secured to the boss with a screw, a push-button switch mounted on one surface of the packaged circuit board, and an operation button provided to oppose the push-button switch. A stopper rib, which is a counterpart to an end face and a stopper of the packaged circuit board, is provided on a back of the operation button.

When the user pushes the operation button over a predetermined stroke, the stopper rib is brought to butt against the end face of the packaged circuit board and stopper. With this structure, even if a strong force is applied to the push-button switch, the breakage of the switch can be prevented.

However, the above-described conventional push-button switch mount structure, a large space is required inside the housing for the mount. Thus, it is difficult to apply this structure directly to down-sized electronic devices of recent years.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic device includes a housing in which an opening is made, a button fit inside the opening such as to be movable forward and backward, a printed wiring board housed inside the housing and provided with a switch which detects pushing operation of the button and a pair of supports. Each of the supports projects inside the housing such as to support both end portions of the printed wiring board and also serve as a stopper for the button.

The first embodiment of the electronic device will now be described with reference to FIGS. 1 to 8. In this specification, the near side to the user (that is, user side) is defined as front F, the far side from the user is rear R, the left-hand side of the user is left, the right-hand side of the user is right, the upper side from the user's position is up and the lower side from the user's position is down.

Figure 1:
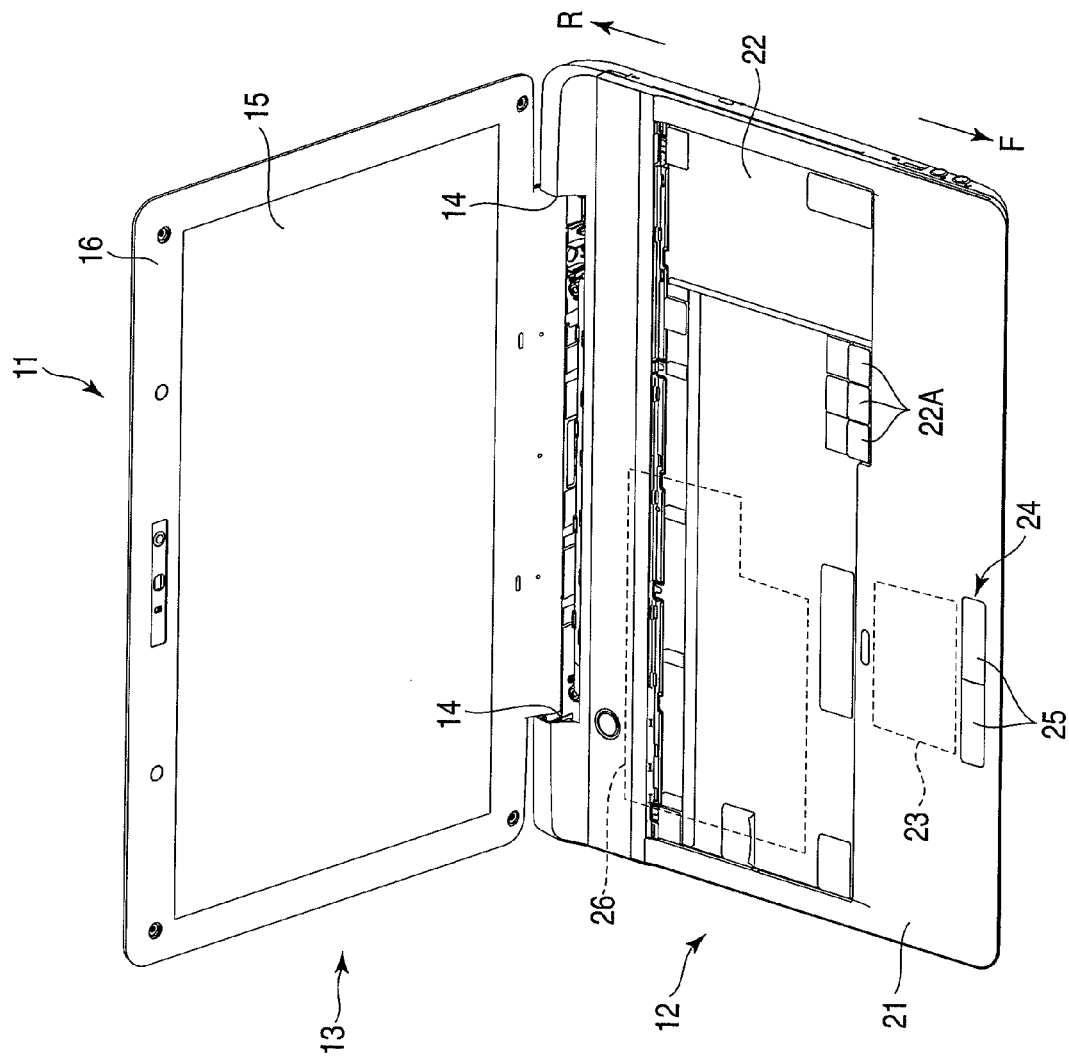
FIG. 1 is an exemplary perspective view showing a portable computer according to the first embodiment.
Figure 2:
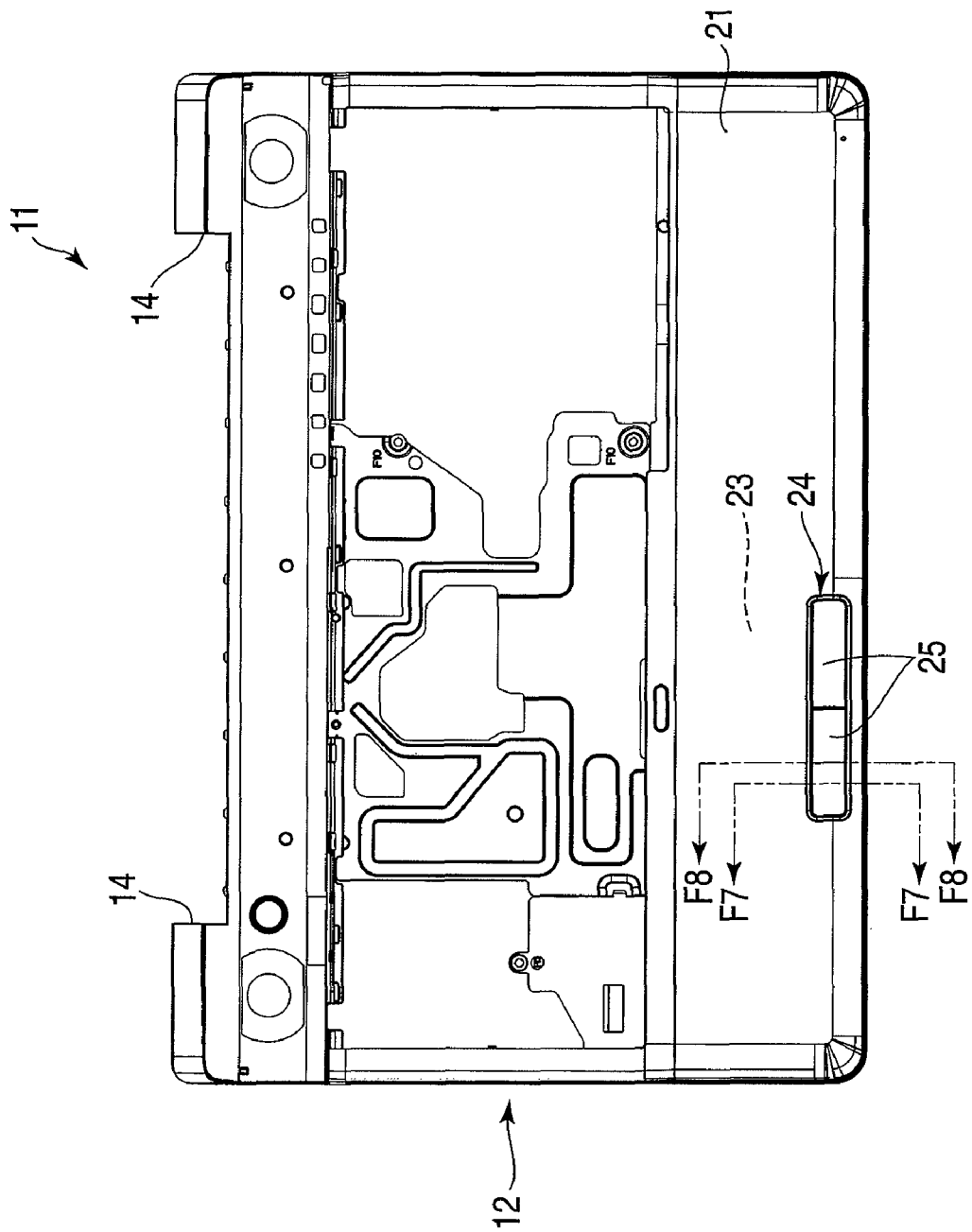
FIG. 2 is an exemplary top view showing a main body unit of the portable computer shown in FIG. 1.
Figure 3:
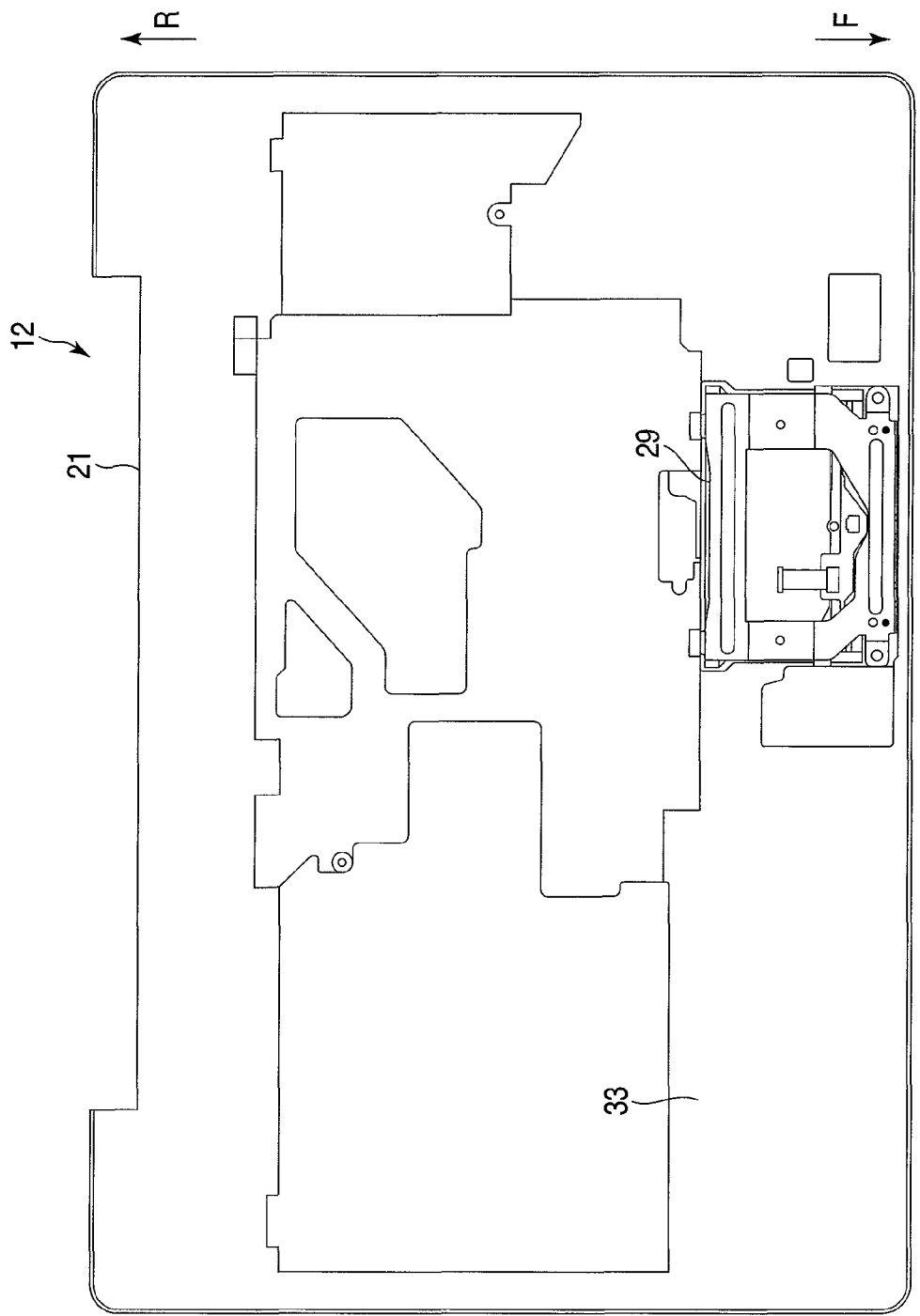
FIG. 3 is an exemplary bottom view showing a part of a main body case of the main body unit shown in FIG. 2 viewed from below.

As shown in FIG. 1, a portable computer 11, which is an example of the electronic device, comprises a main body unit 12, a display unit 13, and a hinge portion 14 provided between the main body unit 12 and the display unit 13. The hinge portion 14 supports the display unit 13 such as to be pivotable.

The display unit 13 comprises a display 15 and a display case 16 formed of, for example, a synthetic resin, such as to enclose the display 15. As an example of the display 15, a liquid crystal display is mounted in this embodiment.

As shown in FIGS. 1 to 4 and 7, the main body unit 12 comprises a main body case 21 formed of, for example, a synthetic resin, into a box shape, a keyboard 22 and a touch pad 23 mounted on the upper surface of the main body case 21, a substantially rectangular opening 24 made in the main body case 21, a pair of buttons 25 fit into the opening 24, a main circuit board 26 housed inside the main body case 21, a switch circuit board 27 housed also inside the main body case 21 such as to be separated from the main circuit board 26, a pair of supports 28 projecting within the main body case 21 so as to support both end portions of the switch circuit board 27, a reinforcing plate 29 which reinforces the switch circuit board 27 and screws 30 which secure the switch circuit board 27 and reinforcing plate 29 to the supports 28. It should be noted that the term "housing" used in the embodiment is a technical concept which includes the main body case 21 and display case 16. Further, keys 22A shown in the drawing are only a part of the keyboard 22.

Figure 5:
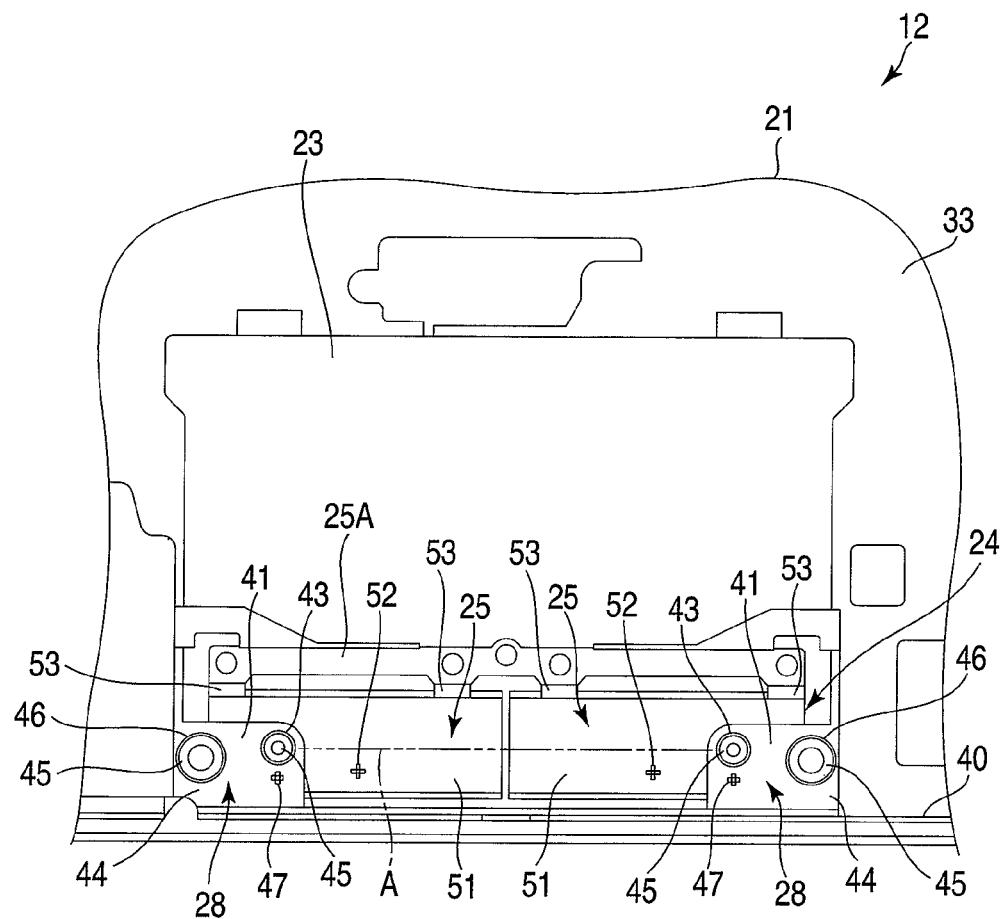
FIG. 5 is an exemplary bottom view showing the state in which a switch board is removed from the main body case shown in FIG. 4.

As shown in FIG. 5, the main body case 21 comprises a shield layer 33 on its inner surface, which is a metal thin film formed by such a technique as spattering. The shield layer 33 prevents the electromagnetic waves generated from circuit parts, etc. within the main body case 21 from transmitting the main body case 21 as leakage to the outside or, reversely, external electromagnetic waves from entering the main body case 21 causing adverse effects on the circuit parts within the main body case 21.

The reinforcing plate 29 is formed of a metal material such as of iron into a shape of a substantially square frame. The reinforcing plate 29 not only reinforces the switch circuit board 27 while supporting it, but also serves to electrically connect the switch circuit board 27 and shield layer 33 to each other. An opening 38 is made in the reinforcing plate 29 at its center. Bent structural parts 31 elongating in the right to left direction are provided in front and rear parts of the reinforcing plate 29, thereby improving its mechanical strength. Further, the reinforcing plate 29 comprises a pair of nail portions 32. As the nail portions 32 are plugged into plug-in sections 21A of the main body case 21, the reinforcing plate 29 is secured to the main body case 21.

Figure 4:
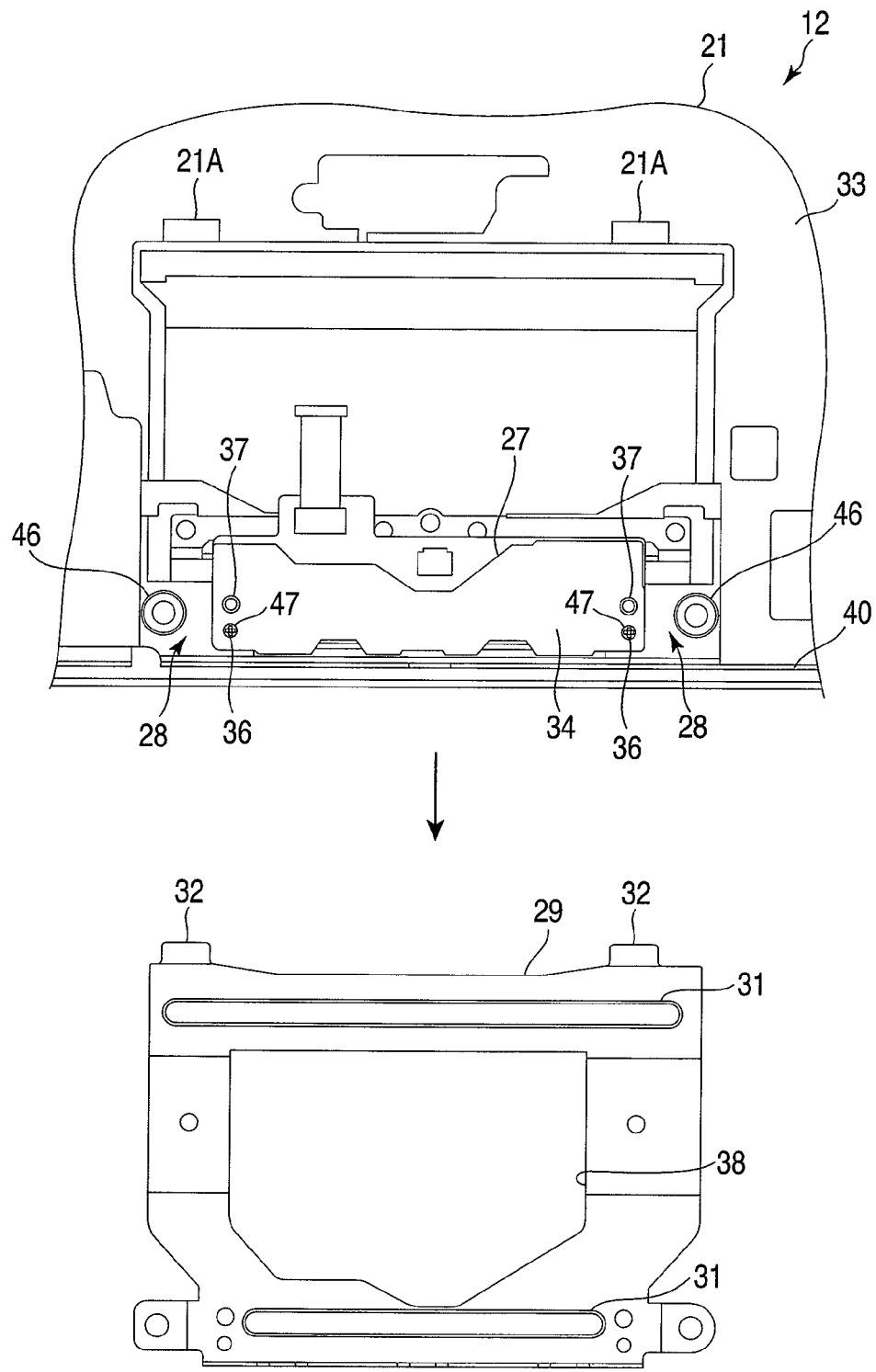
FIG. 4 is an exemplary bottom view showing the state in which a reinforcement plate is removed from the main body case shown in FIG. 3.
Figure 7:
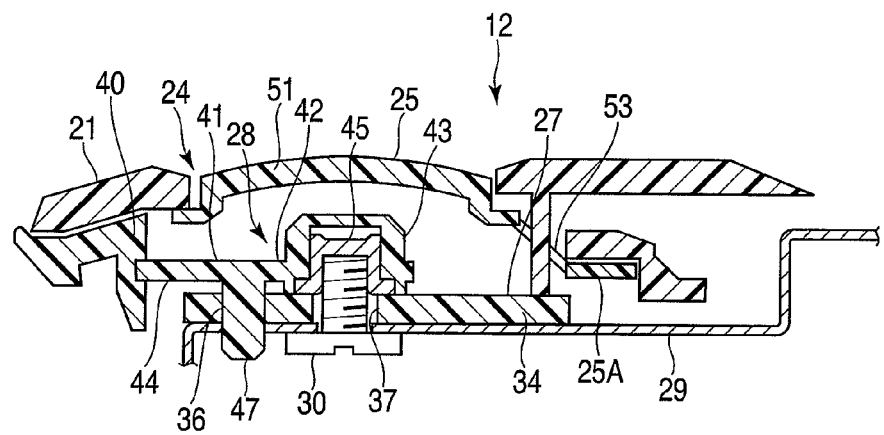
FIG. 7 is an exemplary cross section taken along the line F7-F7 shown in FIG. 2.
Figure 8:
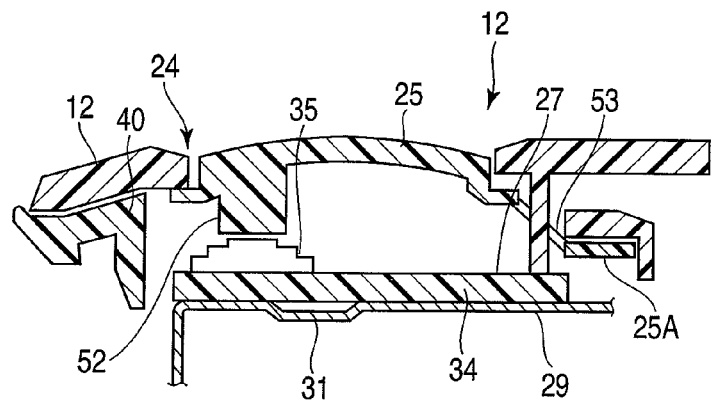
FIG. 8 is an exemplary cross section taken along the line F8-F8 shown in FIG. 2.

The switch circuit board 27 is an example of the printed wiring board. Also, the switch circuit board 27 is an example of the parts housed inside the main body case 21. As shown in FIGS. 4 and 8, the switch circuit board 27 comprises a circuit board main body 34 formed into a shape of a substantially rectangular plate, and a switch 35 mounted on the circuit board main body 34. The switch 35 can detect the movement (pushing) of the button 25. Further, the circuit board main body 34 comprises a positioning hole 36 through which a positioning pin 47 is put, which will be later described, and a screw hole 37 through which a screw 30 is put. The switch circuit board 27 is bridged between the two supports 28. The screws shown in FIG. 7 are an example of the fixing tools.

Figure 6:
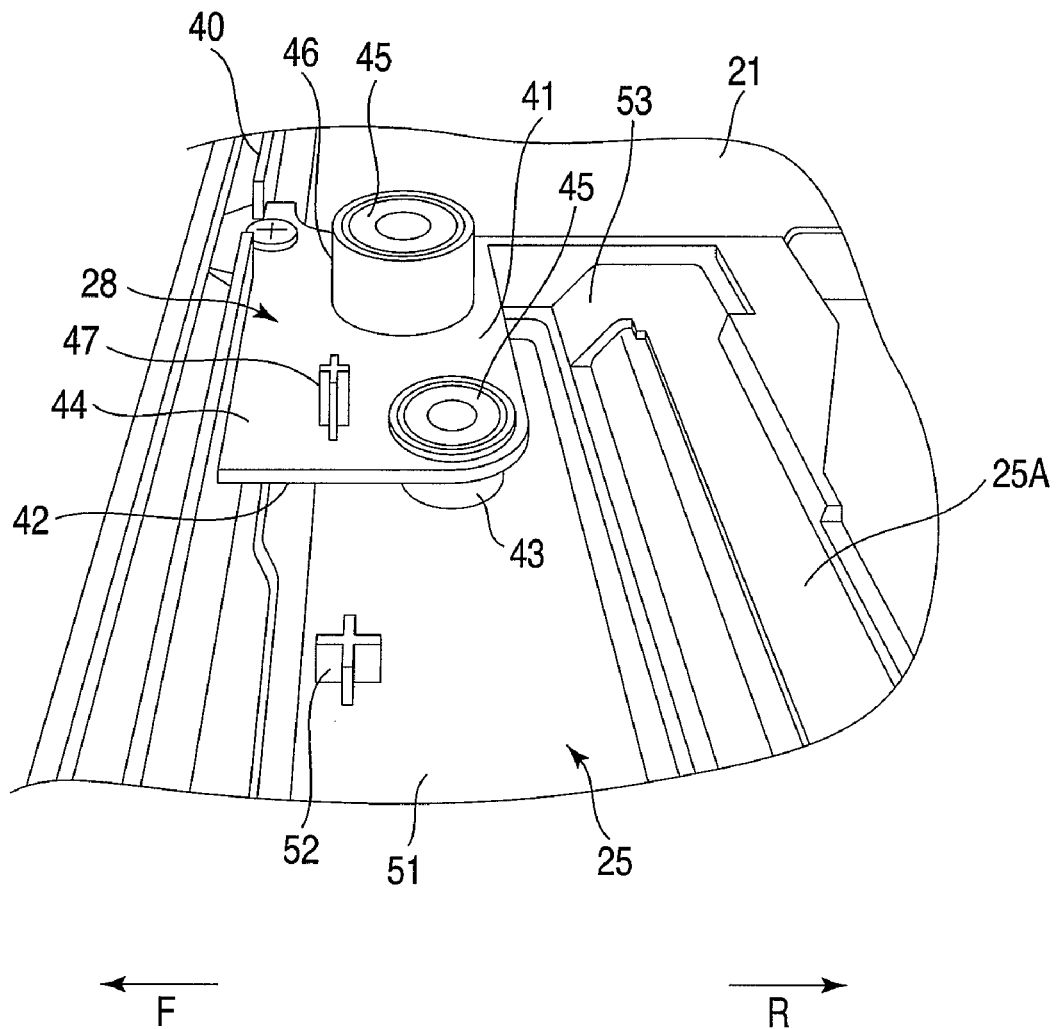
FIG. 6 is an exemplary perspective view showing one of the supports of the main body unit shown in FIG. 4.

As shown in FIGS. 5 and 6, each of the supports 28 comprises a support main body 41 of a square plate shape projecting from a frame-like portion 40 of the main body case 21, a first surface 42 formed in the support main body 41, a boss 43 formed on the first surface and projecting towards the button 25, a second surface 44 formed on an opposite side to the first surface 42 of the support main body 41, an insert 45 buried inside the boss 43 and accepting the screw 30 inserted thereto, a projecting portion 46 which secures the reinforcing plate 29 with the screw 30 and the positioning pin 47 which positions the switch circuit board 27.

The supports 28 as a pair are provided in the main body case 21 at locations separated in the width direction normally crossing the front to rear direction of the case 21, which correspond to longitudinal both end portions of the switch circuit board 27. In other words, the supports 28 are placed at the positions corresponding to both end portions of the opening 24. As shown in FIG. 7, the switch circuit board 27 is secured to the second surface 44 of each of the supports 28. The boss 43 not only includes the insert 45 placed therein, but also functions as a stopper which regulates the maximum pushdown position of the button 25. As shown in FIG. 6, the insert 45 is buried inside the projecting portion 46 as well. The projecting portion 46 is provided at a position between a projection 52 of the button 25, which will be later explained, and a secure portion 25A.

The button 25 can move forward and backward within the opening 24. The button 25 is formed of a synthetic resin. As shown in FIGS. 5 and 6, the button 25 is adhered by its securing portion 25A formed in its back, to the main body case 21 by such a technique as welding.

The button 25 comprises a button main body 51, a projecting portion 52 projecting from the button main body 51, a securing portion 25A, and an arm portion 53 provided between the button main body 51 and securing portion 25A. The projecting portion 52 has a substantially cross shape. The projecting portion 52 of the button 25 is located on a front side with respect to the boss 43 of the support 28. The projecting portion 52 is located at a position on a front side with respect to a straight line A indicating the central portion of the button main body 51. The boss 43 butts against the button main body 51 at the maximum push-in position of the button 25 so as to stop the button 25. The button main body 51 is supported by the securing portion 25A and arm portion 53 by the so-called cantilever manner.

Here, with reference to FIGS. 7 and 8, the push-in operation of the button 25 will now be described. As the user pushes the button 25, first, the projecting portion 52 pushes the switch 35 on the switch substrate 27 as shown in FIG. 8. As the user continues to push the button 25 further, the boss 43 shown in FIG. 7 butts against the button main body 51, and the movement of the button 25 is stopped. With this structure, it is possible to prevent the breakage of the switch 35, which can be caused by the user excessively pushing the button 25.

According to the first embodiment, the portable computer 11 comprises a housing in which the opening 24 is made, the button 25 fit inside the opening 24 such as to be movable forward and backward, a printed wiring board housed inside the housing and provided with the switch 35 which detects the pushing operation of the button 25, and a pair of supports 28 projecting inside the housing such as to support both end portions of the printed wiring board and also serving as stoppers for the button 25.

Further, the portable computer 11 comprises the housing in which the opening 24 is made, the button 25 fit inside the opening 24 such as to be movable forward and backward, parts housed inside the housing and the supports 28 projecting inside the housing such as to be able to secure the parts and also serving as stoppers for the button 25.

With the above-described structure, the button 25 being pushed down can be stopped by the supports 28 which support the printed wiring board (parts), and therefore the number of parts can be reduced as compared to the case where the supports 28 and stopper are separately provided. Further, the space required inside the housing can be made smaller.

In this case, the supports 28 each comprises the first surface 42, the boss 43 provided on the first surface 42 and projecting towards the button 25, and the second surface 44 provided on an opposite side to the first surface 42. The printed wiring board is secured to the second surface 44 of the support 28.

With this structure, the printed wiring board can be secured by the second surface 44 and the boss 43 of the first surface 42 can serve as the stopper for the button 25. In this manner, the structure which supports the printed wiring board and serves as a stopper for the button 25 can be realized by a simple configuration.

Further, the structure comprises a securing tool which secures the printed wiring board to the support 28, and the insert 45 to which the securing tool is secured is provided inside the boss 43. With this structure, the space of the section inside the boss 43 can be effectively utilized, and therefore the utilization efficiency of the space can be improved. In this manner, the down-sizing of the portable computer 11 can be further promoted.

Figure 9:
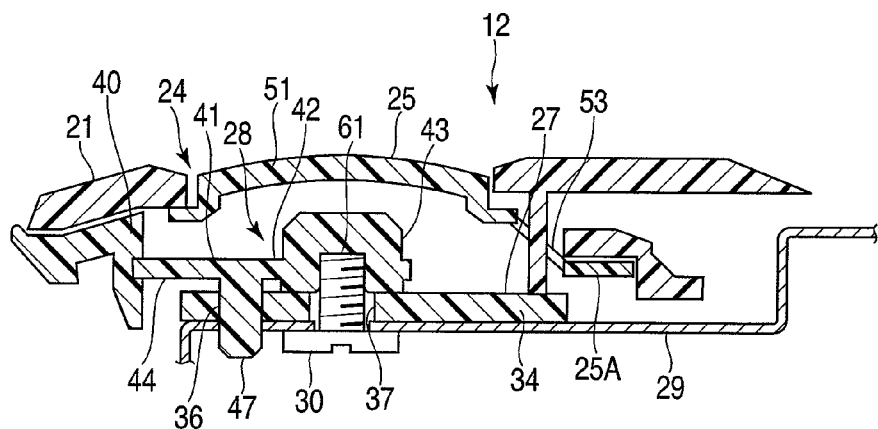
FIG. 9 is an exemplary longitudinal section of a portable computer according to the second embodiment.

Next, with reference to FIG. 9, a portable computer 11 according to the second embodiment will now be described. The potable computer 11 according to the second embodiment is different from that of the first embodiment in the respect that the insert 45 is not provided inside the boss 43, but the rest of the structure is the same as that of the first embodiment. Therefore, the different part will be explained mainly. The same structural parts will be designated by the same reference numerals and the explanations therefor will be omitted. The appearance of the portable computer 11 is the same as that of the first embodiment shown in FIG. 1.

The support 28 comprises a support main body 41 formed into a square plate shape projecting from the frame-like portion 40 of the main body case 21, a boss 43 projecting towards the button 25 from the support main body 41, a screw hole 61 provided inside the boss 43, a projecting portion 46 which secures the reinforcing plate 29, and a positioning pin 47 which positions the switch circuit board 27. The supports 28 as a pair are provided in the main body case 21 at locations separated in the width direction normally crossing the front to rear direction of the case 21, which correspond to longitudinal both end portions of the switch circuit board 27. The supports 28 are located at positions corresponding to both end portions of the opening 24. An insert 45 is buried inside the projecting portion 46. The screw hole 61 is an example of the securing hole, to which a screw 30 can be secured.

According to the second embodiment, the structure comprises a securing tool which secures the printed wiring board to the support 28, and a securing hole to which the securing tool is secured is provided inside the boss 43. With this structure, a securing hole is made inside the boss 43, and therefore the space of the section inside the boss 43 can be effectively utilized. Thus, the utilization efficiency of the space can be improved, and consequently the down-sizing of the portable computer 11 can be further promoted.

The electronic device can be realized as not only the portable computer 11 presented in each of the above-provided embodiments, but also as some other electronic devices including mobile phones. Further, it is natural that the electronic device can be re-modified into various versions within the scope in which the essence of the invention remains when carried out.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a housing comprising an opening;
   a button inside the opening and configured to move forward and backward;
   a printed wiring board inside the housing and comprising a switch configured to be pressed by the button when the button is depressed;
   a pair of supporting portions each projecting inside the housing, which is configured to support end portions of the printed wiring board and to control the movement of the depressed button in the depressing direction;
   a boss projecting from each of the supporting portions towards the button and comprising a slot inside the boss; and
   an attachment tool configured to attach the printed wiring board to each supporting portion when inserted to the slot.

2. An electronic device comprising:
   a housing comprising an opening;
   a button fit inside the opening and configured to move forward and backward;
   a component inside the housing; and
   a supporting portion projecting inside the housing, which is a stopper for the button and configured to support the component;
   a boss on the supporting portion, projecting towards the button and comprising an insert; and
   an attachment tool configured to attach the component to the support portion when attached to the insert.

3. The device of claim 2, wherein the component is a printed wiring board comprising a switch configured to detect depression of the button.

4. An electronic device comprising:
   a housing comprising an opening;
   a button fit inside the opening and configured to move forward and backward;
   a component inside the housing;
   a supporting portion projecting inside the housing, which is a stopper for the button and configured to support the component,
   a boss on the supporting portion, projecting towards the button and comprising a slot; and
   an attachment tool configured to attach the component to the support portion when inserted to the slot.

5. The device of claim 4, wherein the component is a printed wiring board comprising a switch configured to detect depression of the button.

* * * * *